United States Patent [19]

De Filippis et al.

[11] 4,079,395
[45] Mar. 14, 1978

[54] ELECTRONIC FLASH ATTACHMENT FOR CAMERAS

[75] Inventors: John De Filippis, South Amboy, N.J.; George F. Hardy, Pelham, N.Y.

[73] Assignee: International Telephone and Telegraph Corporation, Nutley, N.J.

[21] Appl. No.: 751,822

[22] Filed: Dec. 17, 1976

Related U.S. Application Data

[63] Continuation of Ser. No. 625,358, Oct. 23, 1975, abandoned.

[51] Int. Cl.² .............................................. G03B 15/03
[52] U.S. Cl. .................................................. 354/145
[58] Field of Search .............. 354/126, 135, 137, 138, 354/140, 141, 145, 288, 139, 149; 240/1.3; 315/241 P

[56] References Cited

U.S. PATENT DOCUMENTS

| | | | |
|---|---|---|---|
| 3,364,829 | 1/1968 | Ackerman | 354/137 |
| 3,458,696 | 7/1969 | Kapteyn et al. | 354/126 X |
| 3,521,540 | 7/1970 | Canallo | 354/141 |
| 3,559,548 | 2/1971 | Ackerman | 354/141 |
| 3,559,549 | 2/1971 | Ackerman | 354/141 |
| 3,786,734 | 1/1974 | Long, Jr. et al. | 354/145 X |
| 3,969,737 | 7/1976 | Kendrick | 354/145 X |

OTHER PUBLICATIONS

"Electronic Flash Unit for Cameras...," 13219 Kodak Research Disclosure, Apr., 1975.

*Primary Examiner*—L. T. Hix
*Assistant Examiner*—M. L. Gellner
*Attorney, Agent, or Firm*—John T. O'Halloran; Peter C. Van Der Sluys

[57] ABSTRACT

An electronic flash unit for cameras containing a piezo-electric generator as a voltage source provides electronic flash capability to such cameras which normally employ explosive flash bulbs. The flash unit contains delay circuitry for matching the peak light intensity of the flash to the camera shutter exposure time and also includes limiting resistors for protecting the operator from the hazard of high voltage shock. One embodiment of the flash unit provides secure attachment between the camera and the unit by means of a hinged attaching plate and latching arrangement.

3 Claims, 14 Drawing Figures

TO PIEZOELECTRIC GENERATOR

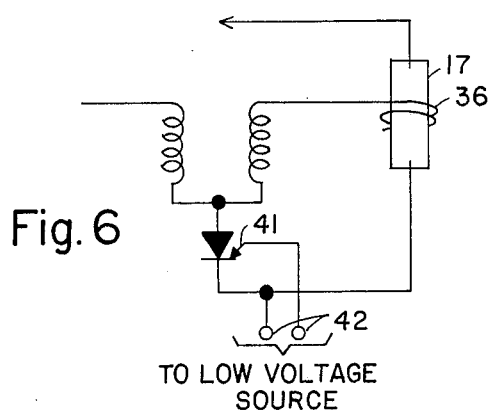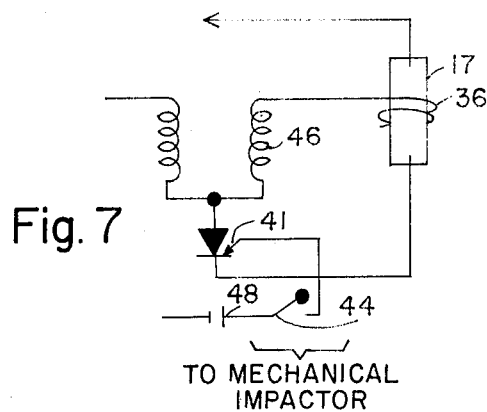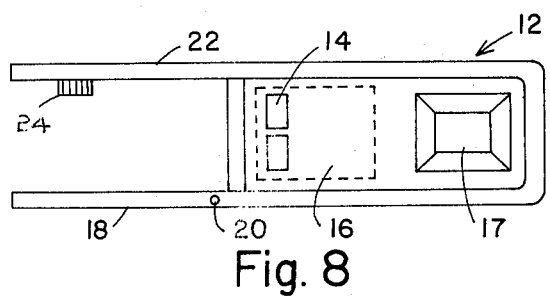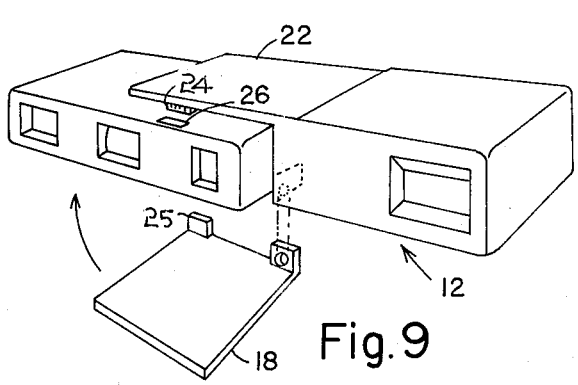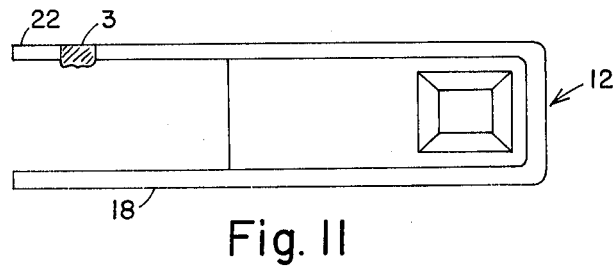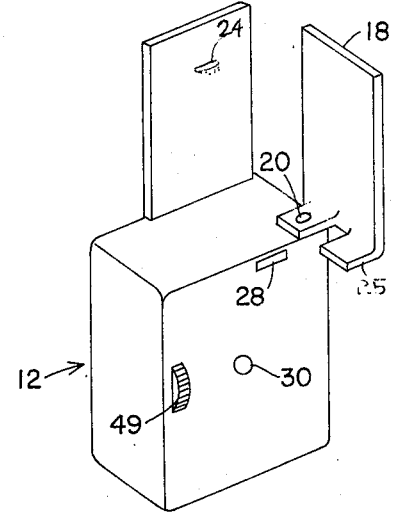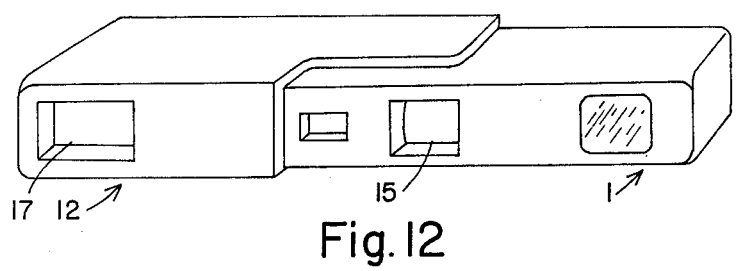

ELECTRONIC FLASH ATTACHMENT FOR CAMERAS

This is a continuation of application Ser. No. 625,358, filed Oct. 23, 1975, now abandoned.

BACKGROUND OF THE INVENTION

Cameras are currently available for providing flash facility without the use of batteries. One example is the pocket camera which contains a striker mechanism for providing impact to a percussive type flash bulb. The percussive flash bulb is custom-designed for this type camera and contains an explosive material which becomes detonated upon impact causing the shredded metal material within the lamp to burn brightly.

Another camera which provides batteryless flash capability contains a piezoelectric generator and striking member within the camera's housing. When the shutter mechanism is actuated the striker impacts the piezoelectric crystal and generates a voltage pulse to fire a combustible flash bulb. The voltage generated by the piezoelectric is of instantaneous duration and is therefore incapable of providing sufficient power to fire a standard filament type flash bulb. The flash bulb required for the piezoelectric camera contains a pair of lead wires having primer material coated on the end of the lead wires within the bulb. The piezoelectric voltage generates an instantaneous arc between the shredded metal and the primer material causing the primer to explode and ignite the metal material.

The problem inherent in the batteryless type cameras is the customizing of particular flash bulb designs which can only operate in their respective cameras. The percussive flash bulb of the pocket camera, for example, is non-operational in the piezoelectric type camera and vice versa.

The purpose of this inventin is to provide an electronic flash attachment which contains a circuit capable of operating in both of the aforementioned camera types.

SUMMARY OF THE INVENTION

A flash unit for cameras provides circuit means and mechanical attachment means for coupling with cameras containing a piezoelectric generator. The circuit is energized by coupling the piezoelectric voltage source with the trigger electrode of a flash lamp through an electric delay circuit.

BRIEF DESCRIPTION OF THE DRAWINGS

FIG. 6 is an enlarged schematic representation of an alternate embodiment of the circuit of FIG. 5;

FIG. 7 is an enlarged schematic representation of another embodiment of the firing circuit of FIG. 4;

FIG. 8 is a front view of the flash attachment of this invention;

FIG. 9 is a top front perspective view of the flash attachment of FIG. 8 including a camera;

FIG. 10 is a bottom perspective view of the inventive flash attachment of FIG. 8;

FIG. 11 is a front view of an alternate embodiment of the inventive flash attachment of FIG. 8; and FIG. 12 is a top front perspective view of the inventive flash attachment of FIG. 8 including a camera in operative attachment therein;

DESCRIPTION OF THE PRIOR ART

A better understanding of this invention can be obtained by a brief review of the prior art of camera photoflash devices as follows.

Figure 1:
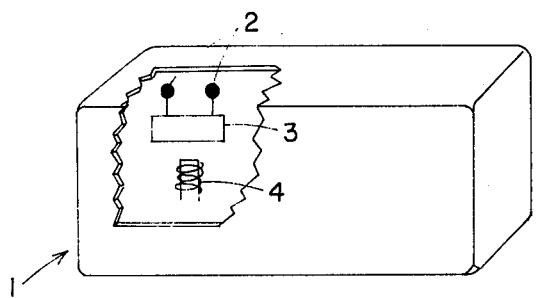
FIG. 1 is a top, cut-away perspective view of one camera of the prior art.

FIG. 1 shows a batteryless camera 1 containing a piezoelectric element 3 and a striker 4. Operation of the camera shutter activates the spring-loaded striker 4 causing the striker arm to contact the piezoelectric element 3 and produce a very short voltage pulse across the contacts 2. One example of a camera containing a piezoelectric voltage generator is described in U.S. Pat. No. 3,677,153.

Figure 2:
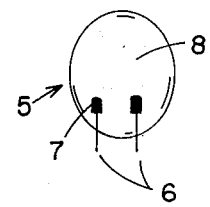
FIG. 2 is a front sectional view of a prior art flash bulb operable with the camera of FIG. 1.

Since the voltage impulse generated by striking a piezoelectric element is of extremely short duration the actual useable power in terms of watt-seconds is generally insufficient to heat the filament of a standard type flash bulb. In order to utilize the piezoelectric voltage pulse a flash bulb was designed without an incandescent filament and employed an instantaneous arc for heating the shredded metal material. One example of a flash bulb that is operative with a piezoelectric voltage pulse can be seen by referring to U.S. Pat. No. 2,972,927. FIG. 2 shows a piezoelectric voltage operable flash bulb 5 containing a shredded metal material 8, a pair of lead wires 6 and primer material 7 coated on the lead wires 6. The piezoelectric voltage pulse is applied to the lead wires 6 and a momentary discharge occurs between either of the lead wires 6 and the shredded metal material 8 or between both lead wires 6. The discharge is sufficient to ignite primer material 7 and cause the shredded metal material to become ignited. One of the problems with the piezoelectric camera and flash bulb arrangement is that the user would have to locate a source of obtaining the piezoelectric type flash bulb 5 since no other type flash bulb would be operative in the camera of FIG. 1.

Figure 3:
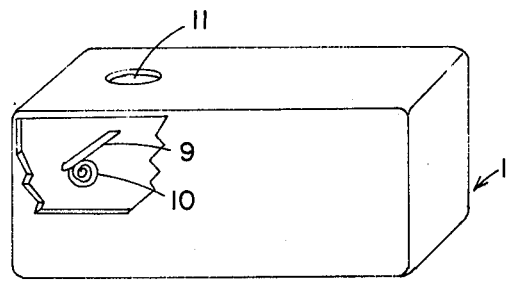
FIG. 3 is a top, cut-away perspective view of another camera of the prior art.

FIG. 3 describes a pocket type camera 1 which contains a striker mechanism 10 and a contact arm 9. Operation of the shutter mechanism activates the striker and brings the contact arm 9 into contact with a percussive type flash bulb. The percussive type flash bulb (not shown) generally contains an explosive material within a bottom extending member which is inserted within the flash bulb socket 11. The explosive material, upon impact, causes the shredded metal material to become ignited in a manner similar to that described for the flash bulb of FIG. 2. One example of a batteryless pocket camera is described in U.S. Pat. No. 3,699,860. This camera, however, is limited only to a percussive flash bulb and will not cause other types of flash bulbs to become ignited.

The advantages of electronic flash lamps over the aforementioned explosive type flash bulbs can be seen by reference to U.S. application Ser. No. 453,666, filed Mar. 21, 1974, now abandoned in favor of continuation-in-part application, Ser. No. 621,322 filed Oct. 10, 1975 and assigned to the assignee of the instant invention. This application, incorporated herein by way of reference, describes an efficient electronic circuit for matching the output characteristics of the electronic flash bulb to the light output characteristics of the explosive type flash bulb. Since the explosive flash bulb produces a light output-time trace which has a relative low intensity and a relative long pulse duration, the camera shutter exposure time for cameras utilizing the explosive flash bulb mechanism is designed to remain open during the entire flash duration. The relatively high intensity and short pulse duration of the electronic flash lamp therefore requires some means for delaying the electronic flash until the shutter is fully open so that the light pulse occurs midway between the opening and closing cycle of the camera's shutter.

The electronic time delay circuit described in detail in the aforementioned application is also employed within the circuit of the instant invention in order to insure the proper light pulse-shutter opening sequence.

One circuit designed for operating an electronic flash with a camera similar to the piezoelectric camera shown in FIG. 1 is described in U.S. Pat. No. 3,782,258. This patent describes the use of a piezoelectric voltage pulse to trigger a flash lamp and includes an auxiliary source of energy to provide sufficient lamp power. The circuit described within the aforementioned patent, however, omits any reference to the time delay necessary for tailoring the burst of light from the electronic flash to the camera shutter response as described above.

DESCRIPTION OF THE PREFERRED EMBODIMENT

Figure 4:
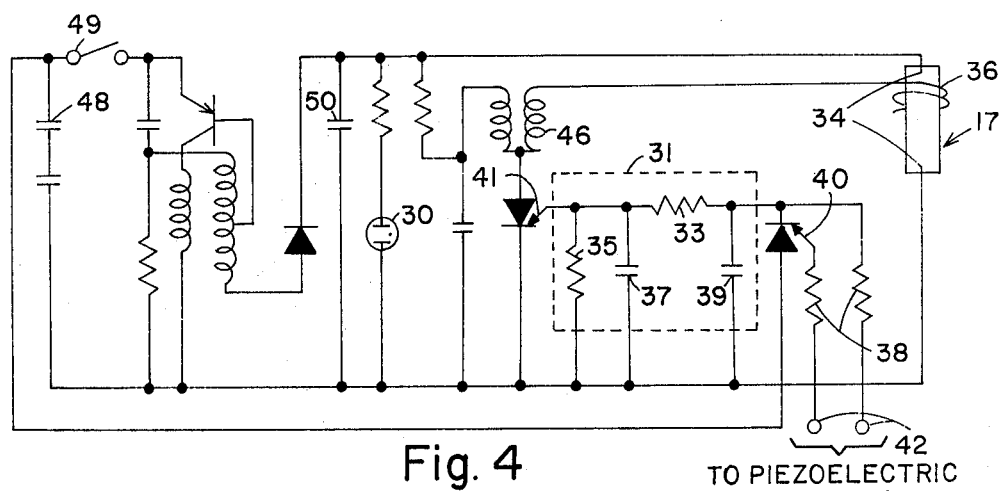
FIG. 4 is a schematic representation of a circuit used in the flash attachment of this invention.

FIG. 4 shows one circuit used in the flash attachment of this invention. The circuit is similar to that described within the aforementioned application with the added inclusion of a silicon control rectifier 40, two limiting resistors 38 and a pair of contacts 42. The contacts 42 are connected to the camera contacts which connect to the piezoelectric generator. The piezoelectric voltage fires the silicon control rectifier 40 and thereby allows a high voltage pulse generated by the transformer 46 to appear at the trigger electrode 36 of flash tube 17. The lamp energy required to complete the discharge is supplied by the battery 48, the oscillator and transformer circuit as shown, and the capacitor 50. The large amount of energy required for lamp ignition is provided at the main electrodes 34 and the trigger electrode 36 merely provides a pre-ignition discharge as is well known in high pressure xenon pulse lamp operation. The limiting resistors 38 prevent any high voltage generated within the circuit from appearing across contacts 42 and limits the current to a very small value in the event that the operator should inadvertently touch the contacts 42 when the aforementioned capacitor 50 is fully charged. This could happen, for example, when switch 49 is closed and the operator places the flash unit in his pocket without discharging the flash tube 17.

The piezoelectric generators generally employed with the circuit of FIG. 4 provide voltages in excess of several hundred volts and sometimes as high as several thousand volts. The choice of the gated diode device such as silicon control rectifier 40 will decide at what particular voltage requirement the tube should fire. The only purpose therefore for the piezoelectric voltage applied to contacts 42 is to switch or connect the circuit so that the high voltage pulse appears at trigger electrode 36 and sufficient energy occurs at main electrodes 34 to ignite the flash tube 17.

Figure 5:
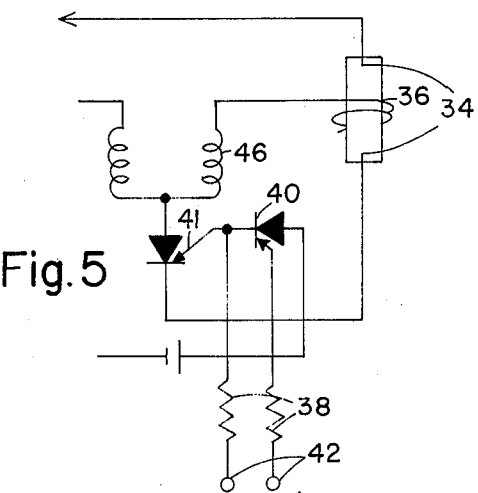
FIG. 5 is an enlarged schematic representation of the firing circuit of the circuit of FIG. 4.

FIG. 5 shows the ignition portion of the circuit of FIG. 4 where the second silicon control rectifier 41 switches the power to main electrodes 34 and also switches the ignition voltage to trigger electrode 36.

FIG. 6 shows an alternate embodiment of the triggering portion of the circuit of FIG. 4 where only the second silicon control rectifier 41 is employed and the value of voltage required to fire is in the order of one to three volts. In this application cameras containing a standard dry cell battery would provide a low voltage pulse to the contacts 42 and in turn one silicon control rectifier 41 to fire flash tube 17. The delay circuit described in the aforementioned U.S. application can also be employed in the circuit of FIG. 6 depending upon the shutter cycle duration and whether the camera is designed for electronic flash or flash bulb operation.

When the camera is designed for flash operation the delay circuit is employed to retard the firing of the flash tube until the shutter is completely opened. This delay circuit enclosed within the dashed lines 31 of FIG. 4 operates briefly as follows. Depression of the camera shutter control causes a piezoelectric voltage pulse to occur at contacts 42. Silicon control rectifier 40, which could be any similar gated device such as a thyristor, for example, becomes conductive and passes current from batteries 48 to the delay circuit 31. The RC delay network consisting of resistor 33, capacitor 37 and resistor 35 are such that the gate potential of silicon control rectifier 41 does not reach its triggering level of roughly 0.7 volts until the required delay time has elapsed. When the gate potential of silicon control rectifier 41 reaches its triggering value, capacitor 43 discharges through the primary coil of transformer 46. The resulting high voltage appears at the trigger electrode 36 of flash tube 17 as described above.

FIG. 7 describes the triggering portion of the circuit of FIG. 4 where a mechanical switch 44 is used in place of electrical contacts. This circuit is used for the cameras having a percussive type flash bulb where in place of the percussive bulb the camera strikes and closes mechanical switch 44 thereby allowing voltage from battery 48 to turn on the silicon control rectifier 41 and fire the flash tube 17. The variations depicted in FIGS. 5, 6 and 7 therefore render the circuit of FIG. 4 operational with all the cameras of the prior art since they include the low voltage triggering source, from cameras for filament flash bulb operation, as well as for cameras having a mechanical impactor and those having a piezoelectric generator.

FIG. 8 shows the inventive flash attachment 12 which includes the housing for flash tube 17, and power supply circuitry 16 and battery 14. In order to securely connect the flash attachment 12 to a camera and to make electrical contact with the camera circuit the attachment 12 includes a pair of plates 18 and 22 and an electrical connector 24. The plate 22 herein defined as a fixed attaching plate contains the connector 24 which, in one embodiment, consists of a blade-type contact having alternate electrical conducting and insulating sections for connecting in a complememtary female type connector on the camera. The hinged attaching plate 18 includes a pivot 20 for rotating the plate 18 out of the way and allowing easy accessibility and maneuverability of the camera during the mounting operation. FIG. 9 shows the flash attachment 12 with the hinged attaching plate 18 moved to a position perpendicular to the fixed plate 22, and shows how camera 1 can be manipulated so that the contact insertion slot 26 of camera 1 can receive the male contact connector 24 which is slidably attached to the fixed attaching plate 22. Once the camera 1 has been inserted within the attachment 12 the hinged attaching plate 18 can then be rotated to a closed position to allow blade 24 to become inserted within a complementary slot on the bottom of the attachment to securely lock camera 1 between plates 18 and 22.

FIG. 10 shows the locking blade 25 in greater detail. Here the hinged attaching plate 18 is shown connected to the flash attachment 12 by means of a pivot 20. The locking blade 25, when the hinged plate 18 is rotated on the pivot 20 onto a closed position, becomes inserted in slot 28 and is firmly held by means of a close press fit. A signal light 38 is also shown on the back of the flash attachment along with the operational switch 49. Both the signal light 30 and switch 49 can be seen by reference to the circuit of FIG. 4.

FIG. 11 shows an alternate embodiment of the inventive flash attachment 12 which includes a piezoelectric crystal element 3 on the fixed attaching plate 22. This embodiment is operative with the camera 1 described earlier in FIG. 3, where the impactor within the camera strikes the piezoelectric elememt 3 and imparts the necessary voltage impulse across the contacts 42 shown in FIG. 4.

FIG. 12 shows the inventive flash attachment 12 containing a camera 1 in a closed operative assembly. In this application the smooth continuous contour fit between the camera 1 and the flash attachment 12 allows the camera-flash attachment assembly to be conveniently carried in pocket or purse and readily adds to the handy features of a pocket camera. The combination of the camera 1 and attachment 12 provides no shock hazard to the operator in view of the limiting resistors 38 in the circuit of FIG. 4 which prevent any significant amount of current from contacting the operator should he inadvertently close the switch 49 as described earlier.

The large separation distance between the flash tube 17 and camera lens 15 is purposely chosen so that the problem of "red eye" familiar to the color photography hobbiest is virtually non-existent in the camera combination depicted in FIG. 12.

Figure 13:
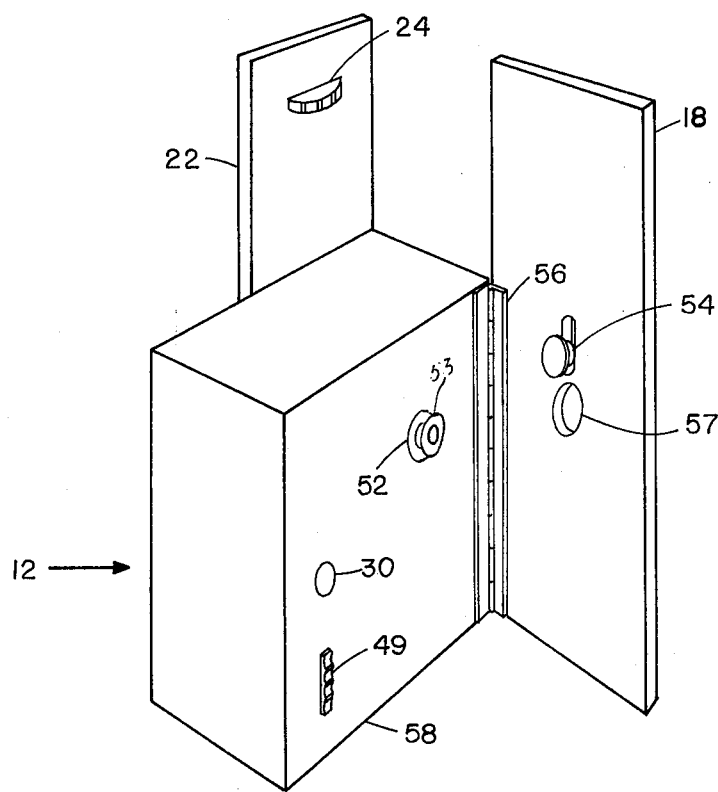
FIG. 13 is a top perspective view of a further embodiment of the inventive flash attachment of FIG. 8.

FIG. 13 shows a further embodiment of the flash attachment 12 of this invention. In this embodiment the attaching plate 18 is coextensive with the back 58 of the flash attachment 12 and provides attachment between the camera and the attachment 12 by means of the cooperation of latching means 54 and the tripod screw 52. The hinged attaching plate 18 is connected to the back 58 of the flash attachment 12 by means of a hinge 56. In order to secure the camera to the flash attachment 12 the camera is inserted between the fixed plate 22 and the hinged attaching plate 18 is closed by moving the attaching plate 18 into contact with the flash attachment back 58. Once the hinged attaching plate 18 is in a closed position the hinged attaching plate 18 is secured to the back of the flash attachment by moving the latch member 54 into contact with tripod screw 52.

Figure 14:
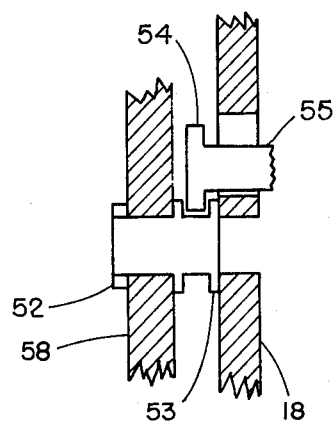
FIG. 14 is an enlarged cross-section of the latching mechanism for the embodiment of FIG. 13.

The cooperative arrangement between latch 54 and tripod screw 52 can be seen by reference to FIG. 14. Here the latch 54 extends through the hinged plate 18 and is connected to a movable switch member 55. Switch 55 is slidably mounted in the hinged plate 18 so that the latch 54 can be moved into the recess formed in extending lip 53. The tripod screw 52 is securely attached to the flash attachment back and is internally threaded for allowing the camera and flash attachment combinations to be secured to a tripod. Access to the internally threaded tripod screw 52 can be made by tripod access hole 57 as shown in FIG. 13. It is to be noted that the ready light 30 shown in FIG. 13 is located above the on-off switch 49 for this embodiment in order that the ready light 30 may be visible to the operator when the hinged attaching plate 18 is in a closed secured position.

Although several applications have been described for use of the inventive flash attachment with various type cameras the invention is not necessarily limited to photography, but finds application wherever instantaneous and intense sources of light may be required.

What is claimed is:

1. A flash unit for a camera of the type utilizing a piezoelectric element to produce a flash lamp firing signal comprising:
   a source of supply voltage;
   a housing, said housing including:
     a body member for enclosing said flash lamp and said source of supply voltage;
     a pair of coupling members extending from said body member for attaching said body member to said camera, said pair of coupling members including a first flat plate extending from said body member and fixedly attached thereto and a second flat plate extending from said body member and movably connected thereto for providing support to said camera when said camera is located intermediate said first and second plates; and
     means on said first plate for electrically coupling said camera to said flash;
   a flash lamp within said housing containing a pair of discharge electrodes and a trigger electrode;
   circuit means in said housing and switch means for coupling operational power to said lamp, said circuit means including at least one first capacitor coupled across the discharge electrodes;
   oscillator means having an input for receiving a source of supply voltage for charging said first capacitor to a predetermined lamp firing voltage;
   indicating means coupled across said first capacitor for indicating when said predetermined firing voltage has been reached;
   a second capacitor coupled to said lamp trigger electrode for supplying sufficient ignition voltage to said trigger electrode;
   a step-up transformer having primary and secondary coils said primary coil having a first terminal coupled with said second capacitor and a second terminal coupled to a first terminal of said secondary coil, said secondary coil having a second terminal coupled to said trigger electrode, said transformer producing the sufficient voltage for lamp ignition;
   a first SCR having a gate, anode, and cathode, said gate receiving the flash lamp firing signal and said anode coupled to said source of supply voltage, said first SCR for amplifying said lamp firing signal;
   a delay line having input and output, said input coupled to the cathode of said first SCR for receiving the output of said first SCR; and
   a second SCR having a gate, anode and cathode, said gate coupled to the output of said delay line, said anode coupled to the junction of said primary and secondary coils, said second SCR becoming conductive when the gate of anode potential exceeds a predetermined level to discharge said second capacitor and cause said lamp to become ignited.

2. The flash unit of claim 1 wherein said body member comprises a four-sided boxlike enclosure having an aperture in one side thereof for providing optical access thereto said flash lamp.

3. A flash unit for a camera of the type which includes a piezoelectric crystal for generating a lamp firing signal, comprising:
- a source of supply voltage;
- electronic flash means coupled to said camera for producing light, said electronic flash means comprising:
  - a body member for enclosing said flash lamp and said source;
  - a pair of coupling members extending from said body member for attaching said body member to said camera, said pair of coupling members including a first flat plate extending from said body member and fixedly attached thereto and a second flat plate extending from said body member and movably connected thereto for providing support to said camera when said camera is located intermediate said first and second plates; and
  - means on said first plate for electrically coupling said camera to said flash;
- means coupled to said flash means, said source of supply voltage and to said camera for amplifying said lamp firing signal, said amplifying means comprising at least one gated diode coupled to said source of supply voltage and triggered by said firing signal; and
- means coupled to said amplifying means for providing a timed firing signal for igniting said lamp.

* * * * *